(12) United States Patent
Iwasaki

(10) Patent No.: US 8,189,182 B2
(45) Date of Patent: May 29, 2012

(54) SEMICONDUCTOR INTEGRATED CIRCUIT DEVICE, OPTICAL SCANNER USING SAME, IMAGE FORMING APPARATUS USING OPTICAL SCANNER, AND RETURN LIGHT IDENTIFICATION METHOD

(75) Inventor: Mitsutaka Iwasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 398 days.

(21) Appl. No.: 12/535,815

(22) Filed: Aug. 5, 2009

(65) Prior Publication Data

US 2010/0033714 A1 Feb. 11, 2010

(30) Foreign Application Priority Data

Aug. 8, 2008 (JP) ................. 2008-205927

(51) Int. Cl.
*G01J 1/12* (2006.01)
(52) U.S. Cl. ............ 356/230; 372/38.02; 347/243; 399/51
(58) Field of Classification Search .......... 356/213–235; 250/234–236; 372/24, 31, 38.02; 347/243, 347/261; 399/50, 51, 151
See application file for complete search history.

(56) References Cited

U.S. PATENT DOCUMENTS

| | | | | |
|---|---|---|---|---|
| 5,418,806 A * | 5/1995 | Araki | ............... | 372/29.015 |
| 5,986,687 A * | 11/1999 | Hori | ............... | 347/246 |
| 6,151,056 A * | 11/2000 | Araki | ............... | 347/246 |
| 6,396,858 B2 * | 5/2002 | Kawakami et al. | ........ | 372/38.02 |
| 7,136,404 B2 * | 11/2006 | Suda | ............... | 372/29.015 |
| 7,301,976 B2 * | 11/2007 | Ikeda et al. | ............... | 372/38.02 |
| 7,349,579 B2 | 3/2008 | Kadowaki et al. | | |
| 7,426,226 B2 * | 9/2008 | Motoyama | ............... | 372/38.02 |
| 2004/0247185 A1 | 12/2004 | Sato et al. | | |
| 2008/0049797 A1 * | 2/2008 | Morisawa et al. | ............... | 372/24 |
| 2009/0052916 A1 * | 2/2009 | Nomura et al. | ............... | 399/51 |
| 2011/0026552 A1 * | 2/2011 | Iwasaki | ............... | 372/38.01 |

FOREIGN PATENT DOCUMENTS

| | | |
|---|---|---|
| JP | 63-124971 | 5/1988 |
| JP | 5-191603 | 7/1993 |
| JP | 5-243652 | 9/1993 |
| JP | 11-273120 | 10/1999 |
| JP | 11-298075 | 10/1999 |
| JP | 2000-258716 | 9/2000 |
| JP | 2001-264011 | 9/2001 |
| JP | 2003-92453 | 3/2003 |
| JP | 2003-101791 | 4/2003 |
| JP | 2004-32494 | 1/2004 |
| JP | 2007-148356 | 6/2007 |
| JP | 2007-200513 | 8/2007 |
| JP | 2007-251967 | 9/2007 |

* cited by examiner

*Primary Examiner* — Hoa Pham
(74) *Attorney, Agent, or Firm* — Cooper & Dunham LLP

(57) ABSTRACT

A semiconductor integrated circuit device controlling a first light amount of light emitted from a light source based on a second light amount of light entering a light amount detection part so that the first light amount becomes a target level is disclosed. The semiconductor integrated circuit device includes a comparison part configured to compare a voltage corresponding to the second light amount and a reference voltage corresponding to the target level; and a drive current control part configured to control a drive current supplied to the light source based on the result of the comparison by the comparison part. The drive current control part includes a return light identification part configured to determine whether the second light amount includes a third light amount of return light occurring discontinuously.

16 Claims, 15 Drawing Sheets

SEMICONDUCTOR INTEGRATED CIRCUIT DEVICE, OPTICAL SCANNER USING SAME, IMAGE FORMING APPARATUS USING OPTICAL SCANNER, AND RETURN LIGHT IDENTIFICATION METHOD

BACKGROUND OF THE INVENTION

1. Field of the Invention

The present invention relates to semiconductor integrated circuit devices, optical scanners using semiconductor integrated circuit devices, image forming apparatuses using optical scanners, and methods of identifying return light.

2. Description of the Related Art

Conventionally, in image forming apparatuses that form electrostatic images by exposing a photosensitive body to laser light emitted from a laser diode of an optical scanner, an initialization operation is performed to determine a current value for causing the laser diode to emit light. According to this initialization operation, the value of a current caused to flow through the laser diode, or the amount of light emission of the laser diode, is caused to increase gradually, and the gradually-increasing amount of light is detected with a photodetector provided inside a laser unit. When the photodetector-detected value becomes a predetermined value, a corresponding current value is determined as a value for causing the laser diode to emit light.

A more detailed description is given below with reference to corresponding drawings.

FIG. 1 is a graph illustrating the relationship between the drive current and the amount of light (light amount) of a common laser diode. In FIG. 1, the horizontal axis represents the drive current of the laser diode, and the vertical axis represents the amount of the laser light emitted from the laser diode.

As illustrated in FIG. 1, the laser diode (hereinafter referred to as "LD") starts to emit light in response to the drive current exceeding a threshold. The drive current at this point is referred to as a threshold current Ith. The drive current enters a light emission region when exceeding the threshold current Ith. In the light emission region, a light emission current Iη is proportional to the light amount. In FIG. 1, IthN denotes a threshold current at normal temperature, IηN denotes a light emission current for a light amount L at normal temperature, IopN denotes a drive current for the light amount L at normal temperature, IthH denotes a threshold current at high temperature, IηH denotes a light emission current for the light amount L at high temperature, and IopH denotes a drive current for the light amount L at high temperature.

As illustrated in FIG. 1, the threshold current Ith and the differential efficiency η (the slope of the straight line in the light emission region in FIG. 1) vary relative to temperature. The differential efficiency η tends to decrease with high temperatures. Accordingly, the drive current Iop for maintaining a constant amount of light (the light amount L) varies according to temperature (IopN<IopH), so that the drive current Iop for a desired amount of light (the light amount L) is corrected in an application using the LD. A circuit that automatically corrects (controls) the drive current Iop so that the light amount is constant (at L) is referred to as "automatic power control (APC) circuit." All or some of the circuit blocks of the APC circuit are implemented as a semiconductor integrated circuit device.

FIG. 2 is a diagram illustrating a configuration of an APC circuit mounted in a conventional image forming apparatus.

Referring to FIG. 2, an APC circuit 200 includes a current generation part 202, an I/V conversion part 203, a comparison part 204, and a current control part 205. The APC circuit 200 is connected to a laser unit 201. The laser unit 201 includes a laser diode 201a (hereinafter referred to as "LD 201a") and a photodetector 201b (hereinafter referred to as "PD 201b").

Referring to FIG. 2, when the drive current Iop is caused to flow from the current generation part 202 to the LD 201a of the laser unit 201, the LD 201a emits laser light proportional in amount to the drive current Iop in the light emission region. The laser light is emitted not only toward an object (target) of light emission but also in the direction of the PD 201b of the laser unit 201. The PD 201b generates a monitor current Im proportional to the amount of the emitted light. The monitor current Im is converted into a monitor voltage Vm by the I/V conversion part 203. The monitor voltage Vm indicates the amount of the laser light emitted by the LD 201a.

The comparator 204 compares a reference voltage (reference light amount) Vref and the monitor voltage Vm, and outputs the result of the comparison to the current control part 205. The current control part 205 controls the current of the current generation part 202 based on the comparison result output by the comparator 204. The amount of the laser light emitted by the LD 201a is thus maintained at a desired value corresponding to the reference voltage (reference light amount) Vref.

In this configuration, at the time of causing the LD 201a to emit light, the above-described initialization operation first sets the drive current Iop to a value less than or equal to the threshold current Ith; thereafter gradually increases the drive current Iop; detects the amount of light at the time with the PD 201b; and when the detection value of the PD 201b becomes a predetermined value, determines a corresponding current value as a value for causing the LD 201a to emit light. The determined current value is maintained for a predetermined period of time, and after passage of the predetermined period of time, the current value is redetermined in the same manner.

In order to perform the initialization operation properly, it is desirable to detect the monitor current Im with accuracy. If light that is not supposed to be detected is detected in the PD 201b, the amount of the laser light emitted by the LD 201a varies, for example, becomes excessively large or small, and is not maintained at a desired value. In this case, the LD 201a continues emitting light for a predetermined period of time at a value different from the desired value. Accordingly, optical writing may not be performed with accuracy in the application, and in the worst case, the drive current Iop may exceed a permissible value to break the LD 201a. (See, for example, Japanese Laid-Open Patent Application No. 2001-264011, Japanese Laid-Open Patent Application No. 2003-092453, Japanese Laid-Open Patent Application No. 2007-200513, Japanese Laid-Open Patent Application No. 5-191603, Japanese Laid-Open Patent Application No. 5-243652, Japanese Laid-Open Patent Application No. 11-298075, Japanese Laid-Open Patent Application No. 11-273120, and Japanese Laid-Open Patent Application No. 63-124971.)

SUMMARY OF THE INVENTION

According to one aspect of the present invention, there is provided a semiconductor integrated circuit device controlling a first light amount of light emitted from a light source based on a second light amount of light entering a light amount detection part so that the first light amount becomes a target level, the semiconductor integrated circuit device including a comparison part configured to compare a voltage corresponding to the second light amount and a reference voltage corresponding to the target level; and a drive current control part configured to control a drive current supplied to the light source based on a result of the comparison by the comparison part, wherein the drive current control part includes a return light identification part configured to determine whether the second light amount includes a third light amount of return light occurring discontinuously.

According to one aspect of the present invention, there is provided an optical scanner including a light source; a light amount detection part configured to detect an amount of entering light; the semiconductor integrated circuit device as set forth above; and a deflection part configured to deflect light emitted from the light source on a deflection surface thereof.

According to one aspect of the present invention, there is provided an image forming apparatus including an optical scanner, the optical scanner including a light source; a light amount detection part configured to detect an amount of entering light; the semiconductor integrated circuit device as set forth above; and a deflection part configured to deflect light emitted from the light source on a deflection surface thereof, wherein an image is formed by forming an electrostatic latent image on a photosensitive body by deflecting the emitted light, controlled to be a predetermined light amount by the semiconductor integrated circuit device, with the deflection part and causing the deflected emitted light to scan a photosensitive body.

According to one aspect of the present invention, there is provided a return light identification method including the steps of (a) emitting a predetermined amount of light from a light source; (b) determining whether an amount of light detected in a light amount detection part exceeds a predetermined reference value; (c) waiting for a predetermined period while the light source is emitting the predetermined amount of light; (d) determining whether the amount of light detected in the light amount detection part exceeds the predetermined reference value; and (e) determining occurrence of return light in response to the amount of light exceeding the predetermined reference value in step (b) and not exceeding the predetermined reference value in step (d), or determining no occurrence of the return light in response to the amount of light exceeding the predetermined reference value in step (b) and step (d).

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
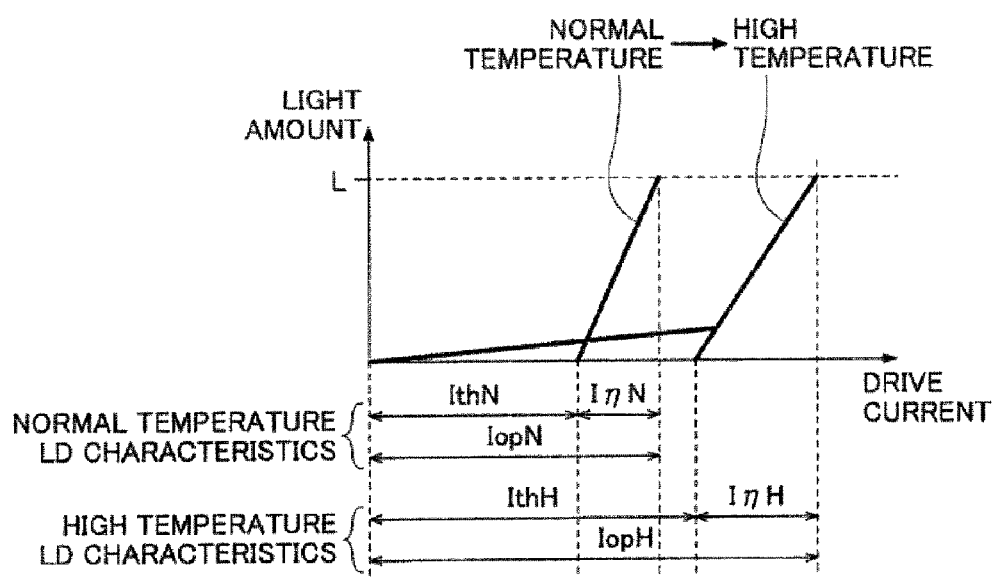
FIG. 1 is a graph illustrating the relationship between the drive current and the amount of light (light amount) of a common laser diode.
Figure 2:
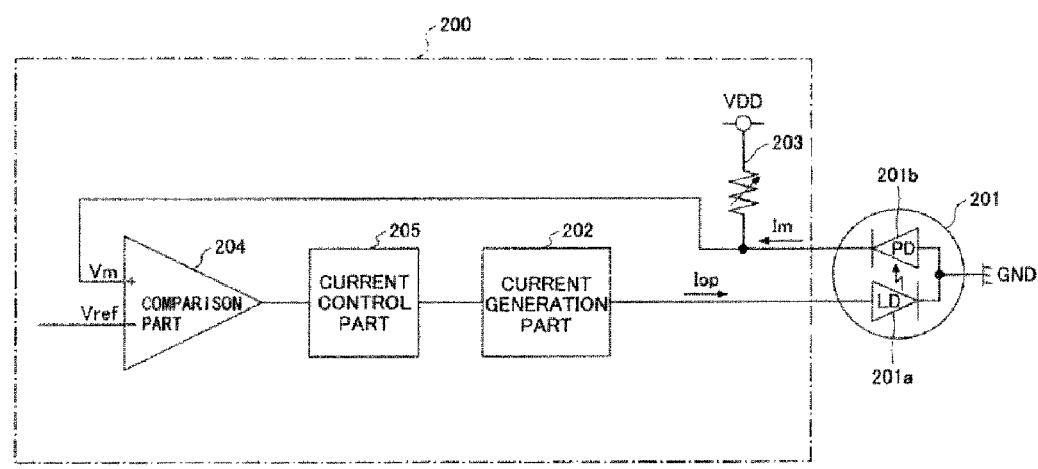
FIG. 2 is a diagram illustrating a configuration of an APC circuit mounted in a conventional image forming apparatus.

In the above-described image forming apparatus including the APC circuit 200 illustrated in FIG. 2, the laser light emitted from the LD 201a is reflected from a rotating polygon mirror to reach a photosensitive body through multiple lenses and a reflecting mirror. Here, the polygon mirror is a rotating member having a series of flat reflection surfaces on its periphery.

In this case, if the laser light is reflected from the polygon mirror under the optical condition of specular reflection (an incident angle of 90 degrees), the reflected light returns directly to the inside of the laser unit 201 to be detected in the PD 201b. This phenomenon is referred to as "return light." The return light occurs every period of scanning by the polygon mirror and thus discontinuously (discretely). If the initialization operation coincides in timing with the occurrence of the return light, the return light is detected in the PD 201b, thus preventing accurate detection of the monitor current Im. As a result, the amount of the laser light emitted from the LD 201a is not determined properly or not set at a proper level (value). Thus, there is a problem in that the return light prevents a current for turning on a laser diode from being determined properly (being set to a proper value) in the initialization operation of the optical scanner used in the conventional image forming apparatus.

In recent times, the time of one scanning period for causing the specular reflection condition has become extremely short because of an increase in the speed of image forming apparatuses. Accordingly, it is difficult to control the occurrence of the return light and the initialization operation so as to prevent them from coinciding in timing with each other.

According to one aspect of the present invention, there are provided a semiconductor integrated circuit device capable of determining a proper current value turning on a laser diode irrespective of the presence or absence of return light in the initialization operation, an optical scanner using the semiconductor integrated circuit device, an image forming apparatus using the optical scanner, and a method of identifying return light in the optical scanner.

A description is given below, with reference to the accompanying drawings, of embodiments of the present invention.

First Embodiment

Figure 3:
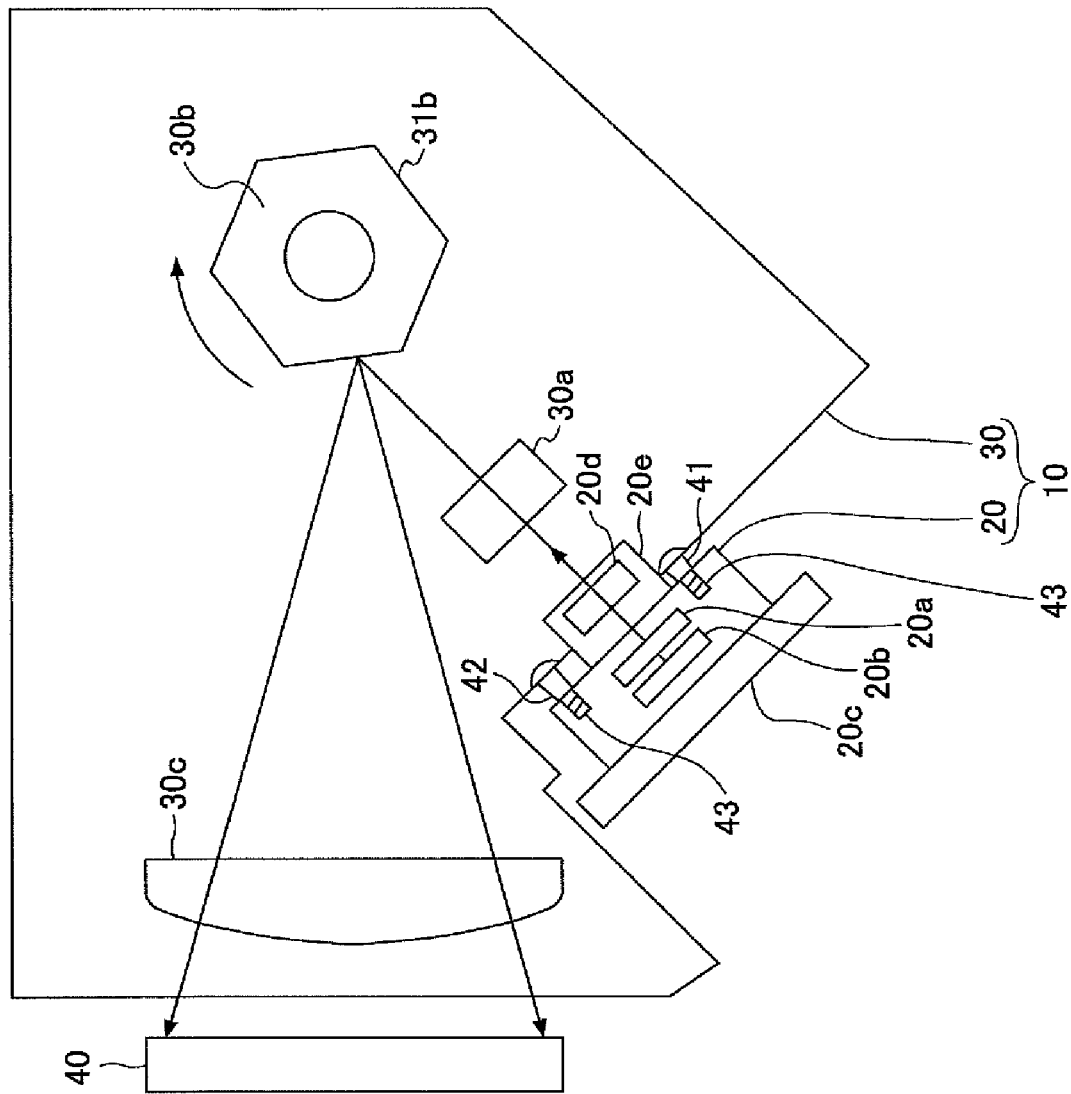
FIG. 3 is a diagram illustrating part of an optical scanner according to a first embodiment of the present invention.

FIG. 3 is a diagram illustrating part of an optical scanner according to a first embodiment of the present invention.

Referring to FIG. 3, an optical scanner 10 includes a laser unit 20 and a writing unit 30. A photosensitive body 40 is configured to be exposed to laser light from the optical scanner 10.

The laser unit 20 includes a laser diode 20a (hereinafter referred to as "LD 20a"), a photodetector 20b (hereinafter referred to as "PD 20b"), an automatic power control (APC) circuit 20c, a collimator lens 20d, and an aperture 20e. The writing unit 30 includes a cylindrical lens 30a, a polygon mirror 30b, and an fθ lens 30c. The APC circuit 20c and the PD 20b form a light amount controller 20g according to this embodiment.

In the laser unit 20, the LD 20a serves as a light source that emits laser light, and the PD 20b serves as a light amount detection part that receives part of the laser light emitted from the LD 20a and causes a monitor current Im (FIG. 4) to flow. The APC circuit 20c serves as a light amount control part that compares a monitor voltage Vm (FIG. 4) into which the monitor current Im is converted with a predetermined reference voltage (reference light amount) Vref (FIG. 4) and controls a drive current Iop (FIG. 4) to be caused to flow to the LD 20a, thereby maintaining the amount of the laser light emitted from the LD 20a at a predetermined value (level) The collimator lens 20d collimates the laser light, which is diverging rays, into parallel rays. The aperture 20e adjusts the spot size of the laser light.

In the writing unit 30, the cylindrical lens 30a determines the sub scanning magnification and the sub scanning beam spot size. The polygon mirror 30b, which is a rotating member that has a series of deflection surfaces (flat reflection surfaces) 31b on its periphery and rotates at a predetermined speed, serves as a deflection part that deflects the laser light and causes the laser light to perform scanning. The fθ lens 30c corrects fθ characteristics.

In the configuration illustrated in FIG. 3, the LD 20a of the laser unit 20 emits laser light under the control of the APC circuit 20c. The laser light emitted from the LD 20a to the collimator lens 20d side enters the writing unit 30 through the collimator lens 20d and the aperture 20e. The laser light that has entered the writing unit 30 travels through the cylindrical lens 30a to reach the polygon mirror 30b.

Figure 4:
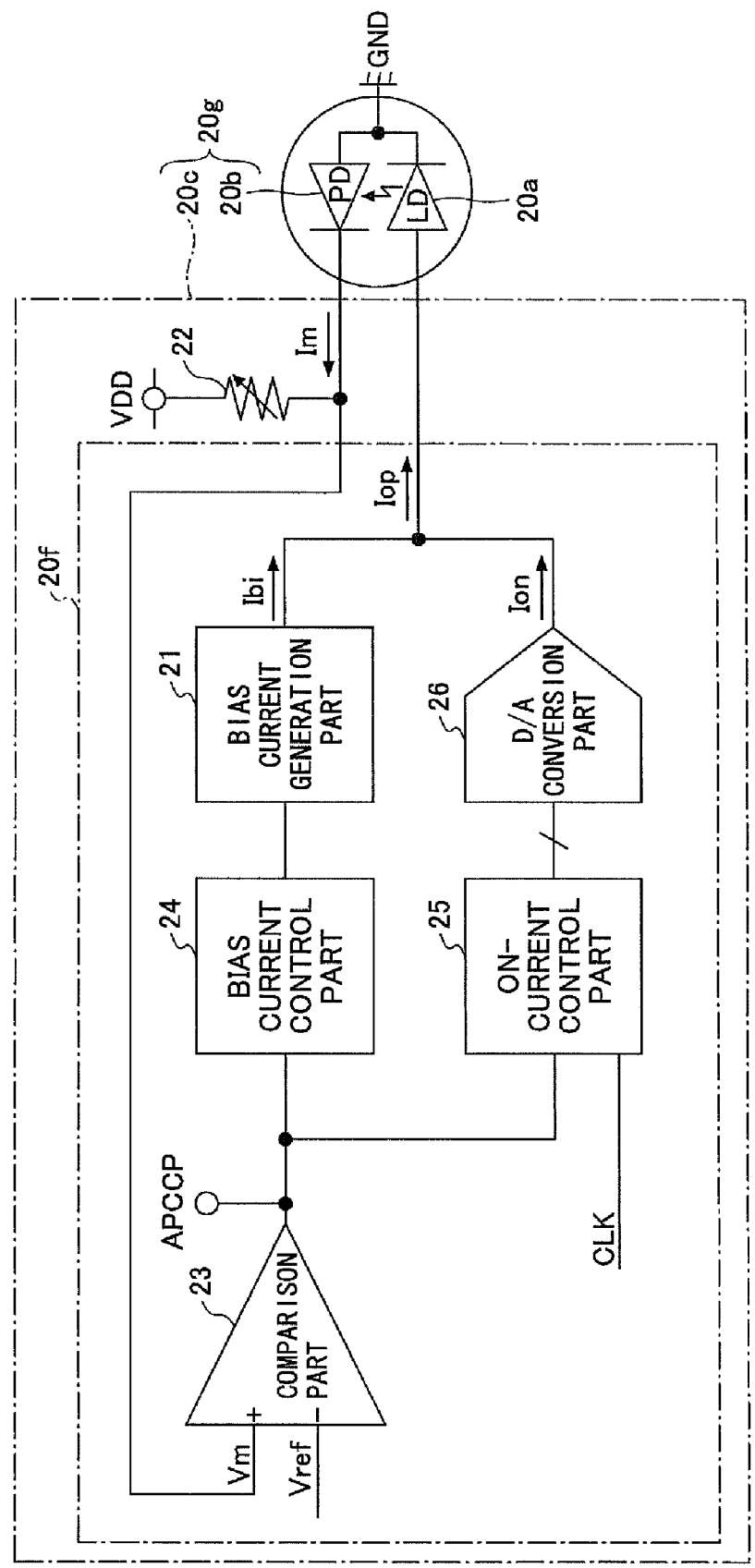
FIG. 4 is a circuit diagram illustrating part of a laser unit of the optical scanner which part corresponds to an LD, a PD, and an APC circuit according to the first embodiment of the present invention.

On the other hand, the laser light is also emitted from the LD 20a to the side opposite to the collimator lens 20d to be received by the PD 20b. The laser light received by the PD 20b is converted into the monitor current Im (FIG. 4). The APC circuit 20c controls the amount of the laser light emitted from the LD 20a based on the monitor current Im so that the amount of the laser light emitted from the LD 20a is maintained at a desired value (level).

The laser light deflected by the deflection surfaces 31b of the polygon mirror 30b travels through the fθ lens to reach the photosensitive body 40. The laser light that has reached the photosensitive body 40 forms an image on the photosensitive body 40 by forming an electrostatic latent image in accordance with its light intensity.

The laser unit 20 is fixed to the writing unit 30 with screws 43 through two spacers 41 and 42 that are different in length.

FIG. 4 is a circuit diagram illustrating part of the laser unit 20 of the optical scanner 10 which part corresponds to the LD 20a, the PD 20b, and the APC circuit 20c according to the first embodiment of the present invention.

Referring to FIG. 4, the APC circuit 20c includes a semiconductor integrated circuit part 20f and an I/V conversion part 22. The semiconductor integrated circuit part 20f is an electronic circuit (IC) having elements such as transistors, resistors, capacitors, and diodes (not graphically illustrated) formed on a board so as to have a predetermined function.

The I/V conversion part 22, which is, for example, an analog variable resistor, is provided external to the semiconductor integrated circuit part 20f and may be configured freely Alternatively, for example, a digital variable resistor (such as a digital potentiometer) may be provided inside the semiconductor integrated circuit part 20f and used as the I/V conversion part 22.

The semiconductor integrated circuit part 20f includes a bias current generation part 21, a comparison part 23, a bias current control part 24, an ON-current control part 25, and a digital-to-analog (D/A) conversion part 26. The output of the bias current generation part 21 and the output of the D/A conversion part 26 are connected to each other, and the anode of the LD 20a is further connected to the connection of the output of the bias current generation part 21 and the output of the D/A conversion part 26. The I/V conversion part 22 has one end thereof connected to power supply VDD and the other end thereof connected to the plus (+) terminal (non-inverting input) of the comparison part 23 and the cathode of the PD 20b. The cathode of the LD 20a and the anode of the PD 20b are connected to ground (GND) (reference potential).

The reference voltage Vref is applied to the minus (−) terminal (inverting input) of the comparison part 23. The reference voltage Vref corresponds to a target value (level) of the amount of the light emitted by the LD 20a. The output of the comparison part 23 is connected to one end of the bias current control part 24 and one end of the ON-current control part 25. The other end of the bias current control part 24 is connected to the bias current generation part 21. The other end of the ON-current control part 25 is connected to one end of the D/A conversion part 26. A reference clock signal CLK of a predetermined frequency is provided to the ON-current control part 25.

Referring to FIG. 4, a bias current Ibi generated by the bias current generation part 21 and an ON current Ion generated by the D/A conversion part 26 are combined into the drive current Iop to flow to the LD 20a. The LD 20a emits laser light proportional in amount to the drive current Iop. The laser light is emitted not only toward an object (target) of light emission but also in the direction of the PD 20a. The PD 20a generates the monitor current Im proportional to the amount of the emitted light. The monitor current Im is converted into the monitor voltage Vm by the I/V conversion part 22. The monitor current Im indicates the amount of the laser light emitted by the LD 20a.

The comparison part 23 compares the reference voltage (reference light amount) Vref and the monitor voltage Vm, and outputs the result of the comparison to the bias current control part 24 and the ON-current control part 25. The output of the comparison part 23 is referred to as "output APCCP." The ON-current control part 25, which serves as a drive current control part to control a drive current to be supplied to the LD 20a based on the comparison result of the comparison part 23, controls the current of the D/A conversion part 26 based on the output APCCP of the comparison part 23. The D/A conversion part 26 sets a DAC code value in accordance with the control of the ON-current control part 25, and generates the analog ON-current Ion corresponding to the set DAC code value.

The bias current Ibi generated by the bias current generation part 21 and the ON-current Ion generated by the D/A conversion part 26 are added up into the drive current Iop to flow to the LD 20a. When the drive current Iop flows through the LD 20a, the LD 20a emits a desired amount of laser light corresponding to the reference voltage (reference light amount) Vref. Thus, the amount of the laser light emitted by the LD 20a is maintained at a desired value corresponding to the reference voltage (reference light amount) Vref.

Figure 5:
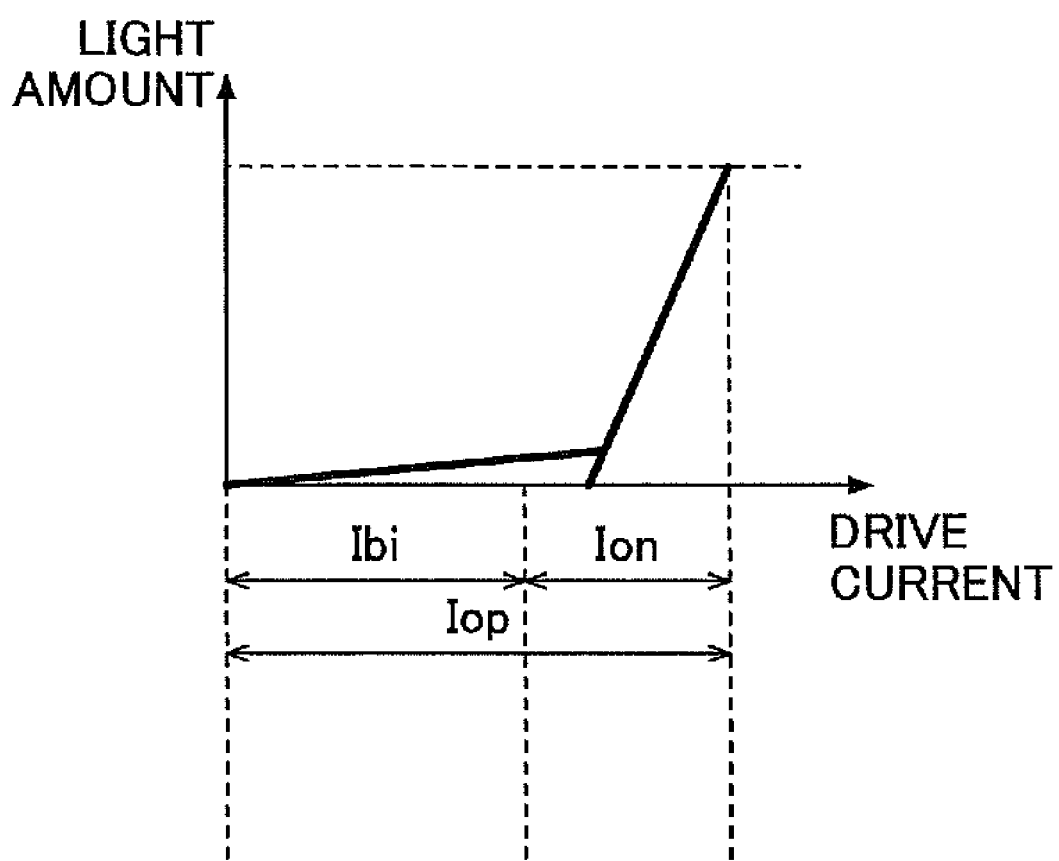
FIG. 5 is a graph illustrating the relationship between a bias current and an ON-current set in the APC circuit of a light amount controller according to the first embodiment of the present invention.

FIG. 5 is a graph illustrating the relationship between the bias current Ibi and the ON-current Ion set in the APC circuit 20c of the light amount controller 20g according to the first embodiment of the present invention.

As illustrated in FIG. 5, the APC circuit 20c illustrated in FIG. 4 generates the drive current Iop by combining the bias current Ibi and the ON-current Ion. The drive current Iop may be a combination of several types of currents having their respective functions.

The bias current Ibi illustrated in FIG. 5 is set to a value that does not exceed a threshold. The ON-current Ion is added to the bias current Ibi so as to generate the amount of light corresponding to the reference voltage Vref. In the initialization operation of the APC circuit 20c, the ON-current Ion is increased to increase the amount of light and the monitor voltage Vm and the reference voltage Vref are compared, thereby determining a current value for generating the reference light amount.

The ON-current Ion may be increased in various manners. In the configuration illustrated in FIG. 4, the ON-current Ion is increased by counting up (incrementing) the DAC code value by the D/A conversion part 26. As the ON-current Ion increases, the monitor voltage Vm (into which the monitor current Im is converted in the I/V conversion part 22) increases accordingly. When the monitor voltage Vm is more than or equal to the reference voltage Vref (Vm≧Vref) in the comparison part 23, the output APCCP of the comparison part 23 becomes HIGH (H) to make known that a desired amount of light has been reached (generated).

Figure 6:
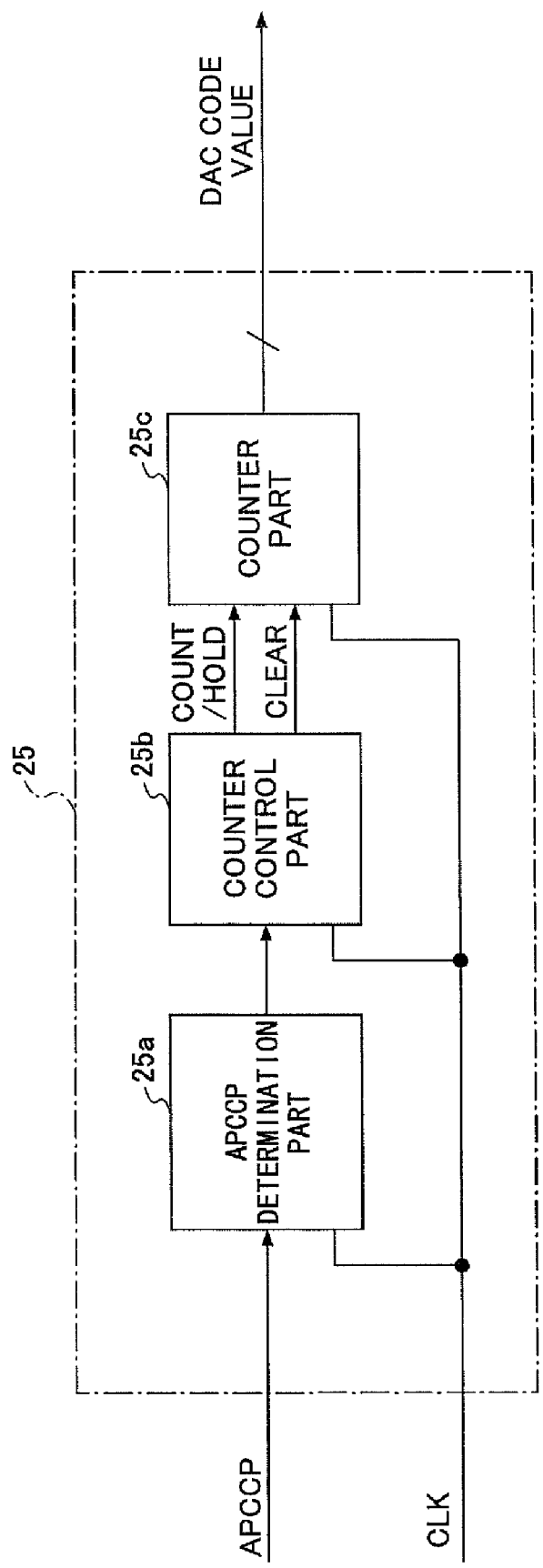
FIG. 6 is a schematic diagram illustrating a configuration of an ON-current control part of the light amount controller according to the first embodiment of the present invention.

FIG. 6 is a schematic diagram illustrating a configuration of the ON-current control part 25 of the light amount controller 20g according to the first embodiment of the present invention.

Referring to FIG. 6, the ON-current control part 25 includes an APCCP determination part 25a, a counter control part 25b, and a counter part 25c. The APCCP determination part 25a, the counter control part 25b, and the counter part 25c are connected in series and operate based on the reference clock signal CLK of a predetermined frequency.

The APCCP determination part 25a is configured to detect that (that is, determine whether) the output APCCP has become HIGH. That is, the APCCP determination part 25a serves as a determination part to determine whether the amount of light detected in the PD 20b, which serves as a light amount detection part, exceeds the reference voltage Vref, which is a predetermined reference value. The counter control part 25b controls the counting, holding, and clearing of the counter part 25c. The counter part 25c converts the counter value set by the counter control part 25b into a DAC code value.

Figure 7:
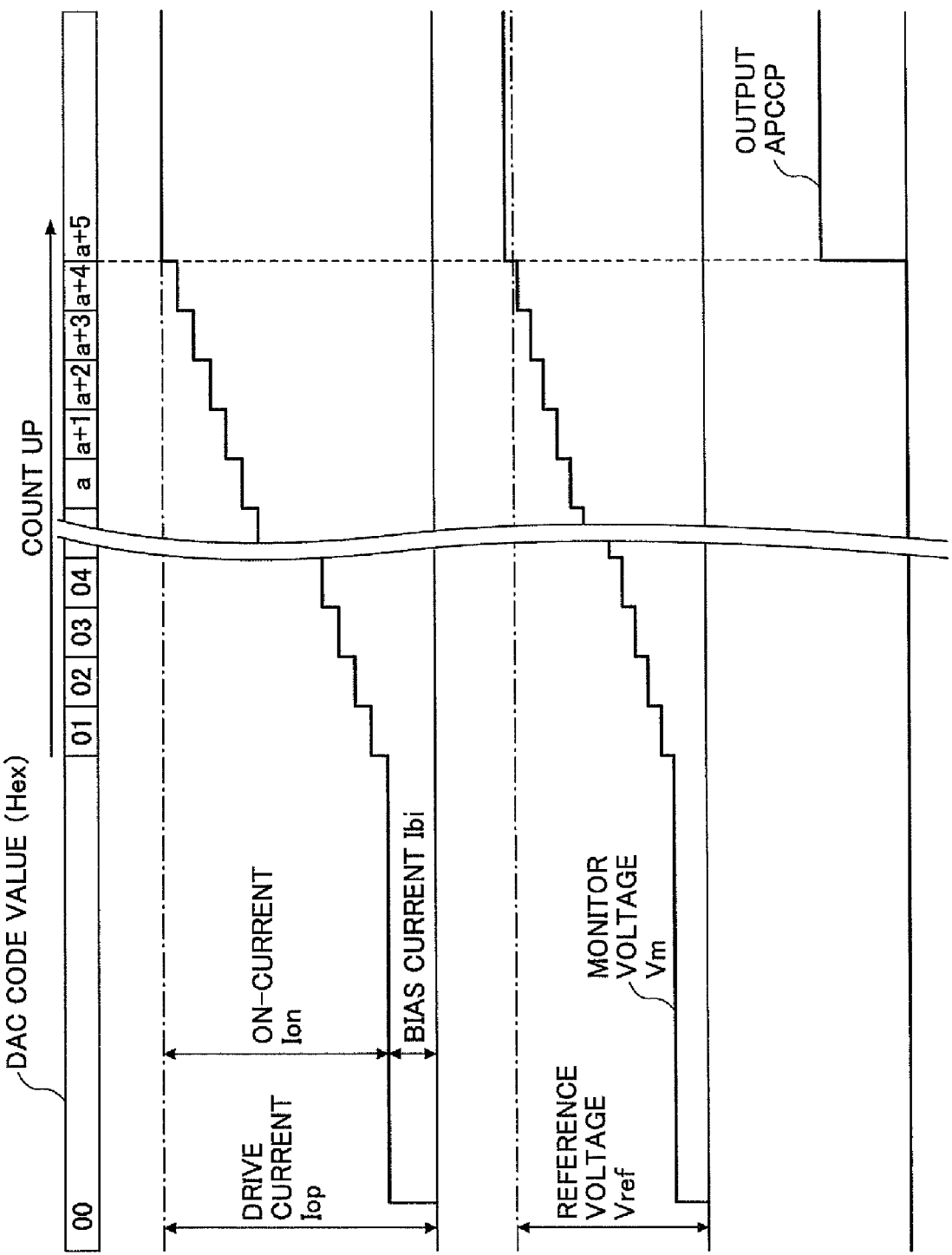
FIG. 7 is a diagram illustrating operating waveforms of the APC circuit of the light amount controller according to the first embodiment of the present invention.

FIG. 7 is a diagram illustrating operating waveforms of the APC circuit 20c of the light amount controller 20g according to the first embodiment of the present invention.

As illustrated in FIG. 7, in the initialization operation of the APC circuit 20c, the counter part 25c counts up (increments) the DAC code value based on instructions from the counter control part 25b, thereby increasing the drive current Iop after D/A conversion.

Referring back to FIG. 6, when the amount of the laser light emitted by the LD 20a reaches a desired value (level), the output APCCP of the comparison part 23 becomes HIGH, so that the APCCP determination part 25a determines that the output APCCP is HIGH and outputs the determination result to the counter control part 25b. The counter control part 25b holds the count value based on the determination result of the APCCP determination part 25a. The count value at this point is the DAC code value for obtaining (generating) a desired amount of light, and the counter part 25c continuously outputs this DAC code value.

In the case illustrated in FIG. 7, the DAC code value is "a+5" when the monitor voltage Vm has become more than or equal to the reference voltage Vref (Vm≧Vref). Accordingly, the DAC code value that determines the drive current Iop for obtaining a desired amount of light is "a+5" (where a is a natural number). The above description is given of the case without return light during the initialization operation. As described above, however, if the occurrence of return light coincides in timing with the initialization operation, the return light is detected in the PD 20b, so that the monitor current Im cannot be detected with accuracy. As a result, the amount of the laser light emitted by the LD 20a is not determined properly or not set to a proper value (level).

Figure 8:
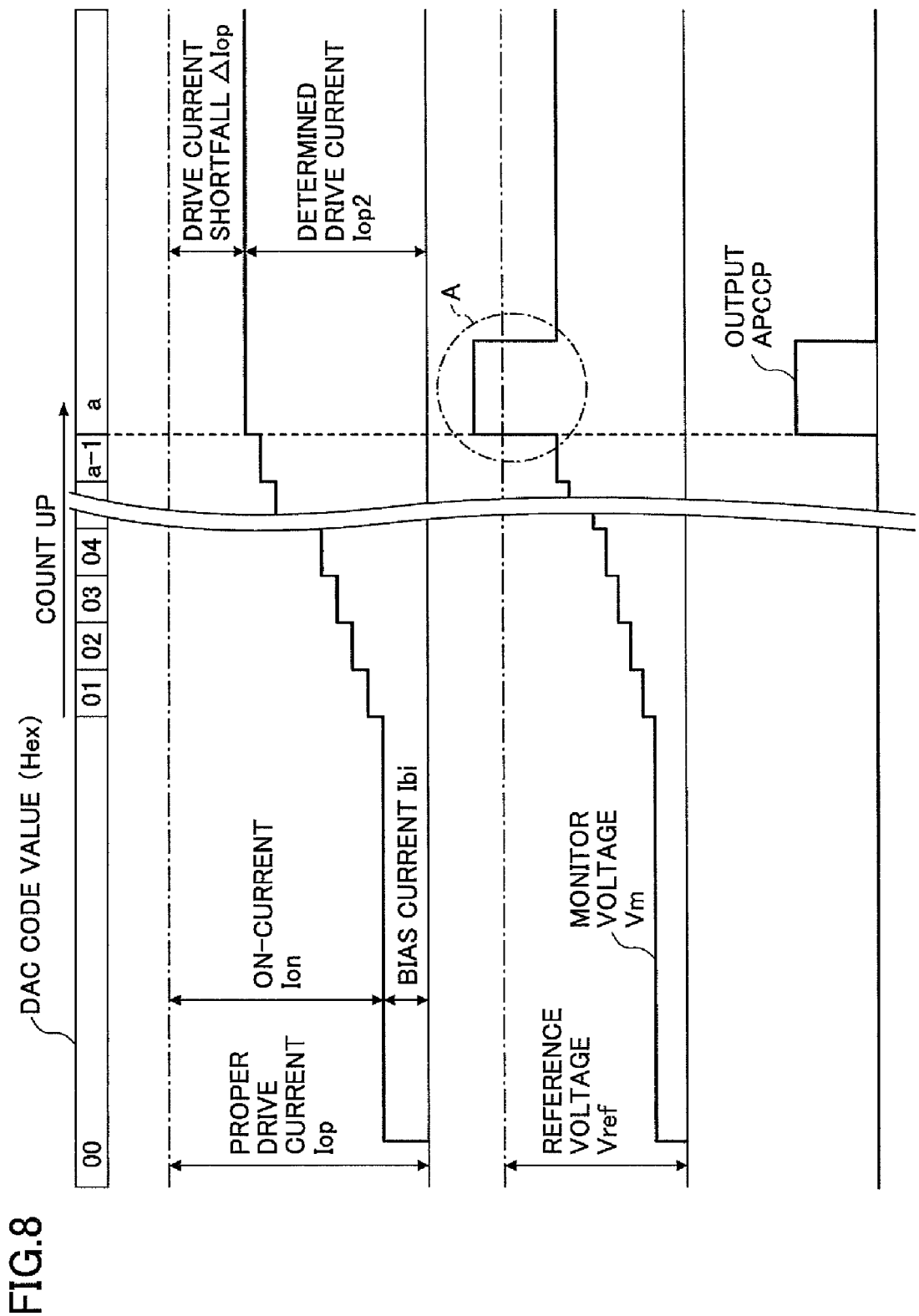
FIG. 8 is a diagram illustrating operating waveforms of the APC circuit in the case where there is return light according to the first embodiment of the present invention.

FIG. 8 is a diagram illustrating operating waveforms of the APC circuit 20c in the case where there is return light. The waveforms illustrated in FIG. 8 assume that a return light identification part according to this embodiment does not function.

As illustrated in FIG. 8, if there is return light, the return light is superposed on the laser light emitted by the LD 20a, which is supposed to be the light to be detected, in the PD 20b. Accordingly, the amount of the laser light emitted by the LD 20a is not determined properly or not set to a proper value (level).

A description is given in more detail with reference to FIG. 8. In the initialization operation of the APC circuit 20c, the counter part 25c counts up (increments) the DAC code value based on instructions from the counter control part 25b, thereby increasing the drive current Iop after D/A conversion. If return light occurs during the counting up, the return light is superposed on the laser light emitted by the LD 20a, which is supposed to be the light to be detected, in the PD 20b. Accordingly, the monitor voltage Vm becomes higher than it is supposed to be as illustrated in the circled part A in FIG. 8.

At this point, when the monitor voltage Vm becomes greater than or equal to the reference voltage Vref (Vm≧Vref), the comparison condition of the comparison part 23 is satisfied. Accordingly, the DAC code value "a" at this point is determined as the DAC code value for determining the drive current Iop for obtaining a desired amount of light. As illustrated in FIG. 7, the DAC code value is supposed to be "a+5." Therefore, the determined DAC code value "a" is lower than what the DAC code value is supposed to be.

That is, a drive current Iop2 corresponding to the determined DAC code value "a" is lower than the proper drive current Iop by ΔIop=Iop−Iop2, so that the amount of light emitted by the LD 20a is less than a desired amount of light. The waveform of the return light illustrated in the circled part A of FIG. 8 is rectangular. However, the return light is not constant in shape, and may vary in time and in peak shape.

Figure 9:
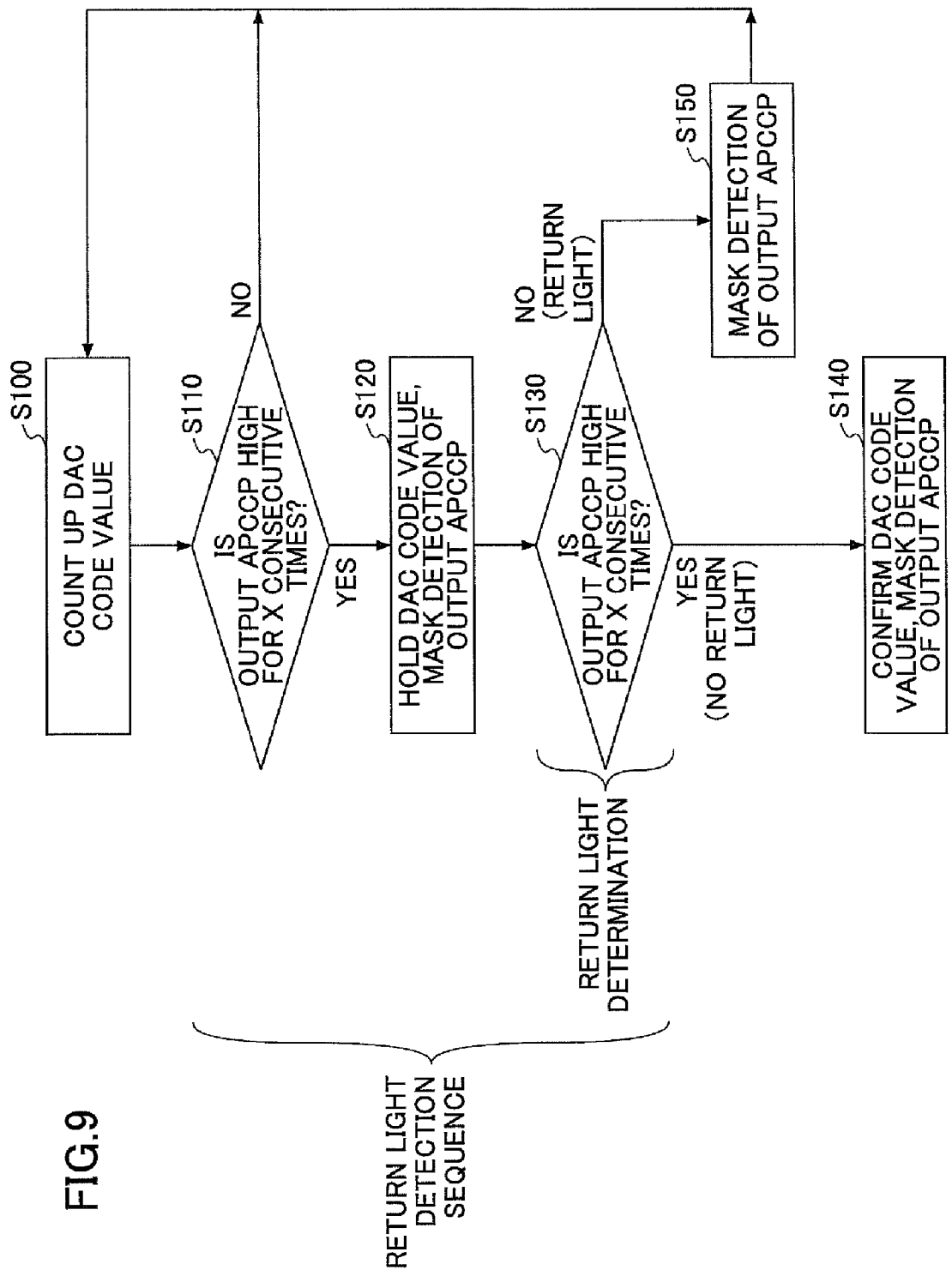
FIG. 9 is a flowchart illustrating an initialization operation of the APC circuit of the light amount controller according to the first embodiment of the present invention.

FIG. 9 is a flowchart illustrating an initialization operation of the APC circuit 20c of the light amount controller 20g according to the first embodiment of the present invention.

Figure 10:
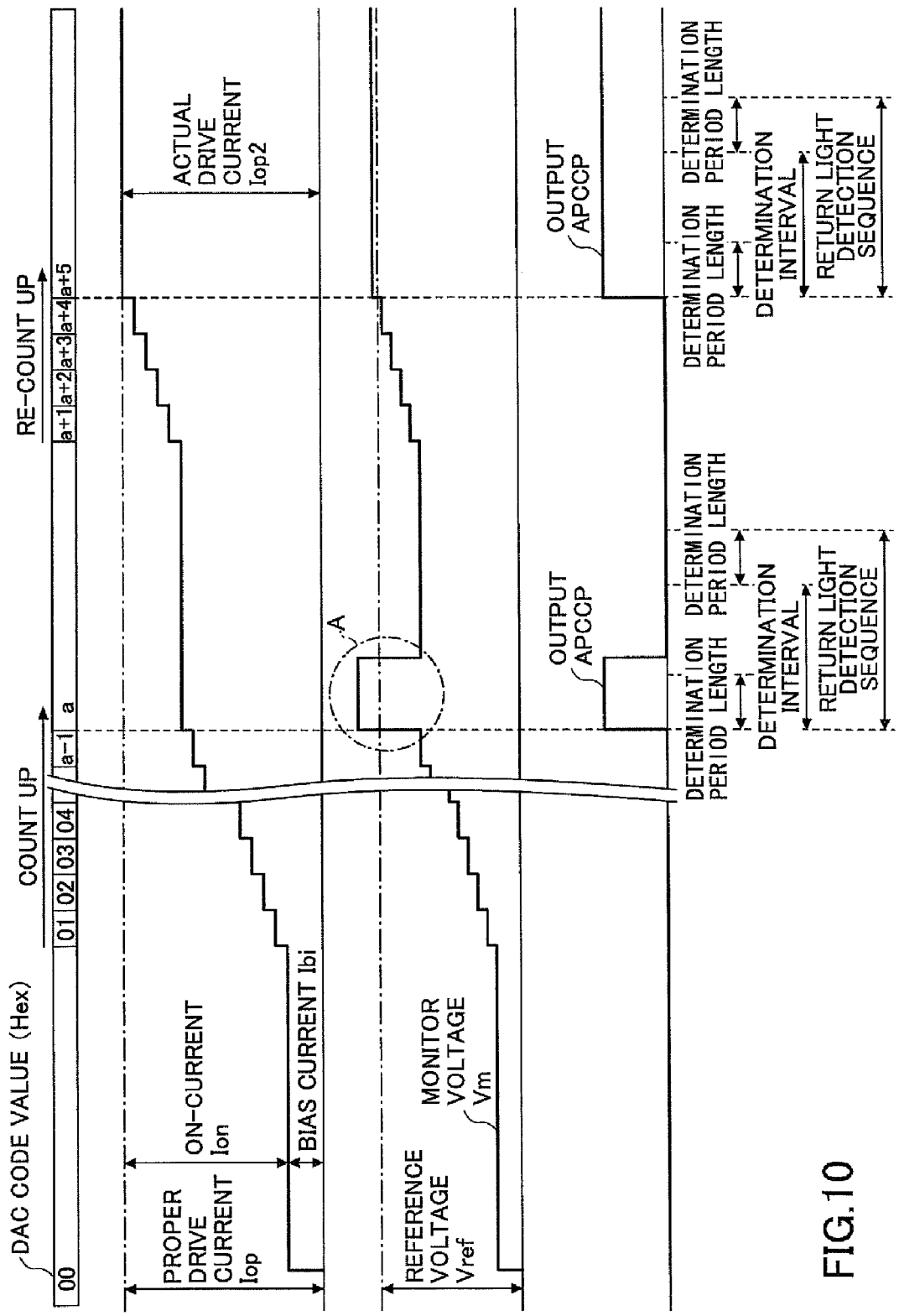
FIG. 10 is a diagram illustrating waveforms of the APC circuit in the case of performing the initialization operation in accordance with the flowchart of FIG. 9 according to the first embodiment of the present invention.

FIG. 10 is a diagram illustrating waveforms of the APC circuit 20c in the case of performing the initialization operation in accordance with the flowchart of FIG. 9.

A description is given, with reference to FIG. 9 and FIG. 10, of the initialization operation of the APC circuit 20c of the light amount controller 20g according to the first embodiment of the present invention.

First, in step S100 of FIG. 9, the counter part 25c counts up (increments) its DAC code value based on instructions from the counter control part 25b so as to increase the drive current Iop after D/A conversion. For example, the DAC code value is counted up (incremented) from 00 to a−1 as illustrated in FIG. 10.

Next, in step S110, the APCCP determination part 25a of the ON-current control part 25 determines whether the output APCCP of the comparison part 23 is HIGH X times in a row (where X is a natural number), and outputs the result of the determination to the counter control part 25b. If the APCCP determination part 25a determines that the output APCCP is HIGH X times in a row (YES in step S110), the operation proceeds to step S120. If the APCCP determination part 25a determines that the output APCCP is not HIGH X times in a row (NO in step S110), the operation returns to step S100 to repeat the above-described processing.

The period for which the APCCP determination part 25a determines whether the output APCCP is HIGH X times in a row is referred to as "determination period," and its length is referred to as "determination period length." The determination period length means performing sampling X times (extracting X samples) during the period of X pulses of the reference clock signal CLK. If HIGH (level) is detected at every sampling time, the determination result is YES. If LOW (level) is detected at any one of the X sampling times, the determination result is NO. If the output APCCP includes chattering, it is preferable to set X to a relatively large value.

Next, in step S120, the counter control part 25b instructs the counter part 25c to hold the DAC code value. The counter part 25c holds its DAC code value in response to the instruction from the counter control part 25b. Further, the counter control part 25b masks the determination result input by the APCCP determination part 25a.

After step S120, there is a predetermined wait (standby) period. Next, in step S130, the APCCP determination part 25a determines whether the output APCCP is HIGH X times in a row, and outputs the result of the determination to the counter control part 25b. If the APCCP determination part 25a determines that the output APCCP is HIGH X times in a row (YES in step S130), the operation proceeds to step S140.

The interval between the start of the determination as to whether the output APCCP is HIGH in step S110 and the start of the determination as to whether the output APCCP is HIGH in step S130 is referred to as "determination interval." The determination interval may be the duration of Y pulses of the reference clock signal CLK (where Y is a natural number). As described above, the return light occurs every period of scanning by the polygon mirror and thus discontinuously (discretely). Therefore, it is preferable that the determination interval be sufficiently shorter than a single period of scanning by the polygon mirror 30b (a period of occurrence of return light). For example, if Y is set to 10 to 20 in the case of the reference clock signal CLK having a frequency of approximately 1 to 3 MHz (approximately 0.3 μs to 1 μs), the determination interval is approximately 3 μs to 20 μs.

Next, in step S140, the counter control part 25b instructs the counter part 25c to confirm the DAC code value. The counter part 25c confirms (fixes) its DAC code value in response to the instruction from the counter control part 25b.

Further, the counter control part 25b masks the determination result input by the APCCP determination part 25a.

If the APCCP determination part 25a determines that the output APCCP is not HIGH X times in a row (NO in step S130), the operation proceeds to step S150. In step S150, the counter control part 25b masks the determination result input by the APCCP determination part 25a. Thereafter, the operation returns to step S100 to repeat the above-described processing.

In the flowchart illustrated in FIG. 9, steps S110 through S130 may correspond to a return light detection sequence. The return light detection sequence is a base cycle, which is repeated until no return light is detected. If the result of step S110 is YES and the result of step S130 is NO, this is the case where return light has been detected. For example, if the output APCCP of the comparison part 23 becomes HIGH because of return light as illustrated in the circled part A of FIG. 10 (a DAC code value "a"), the determination result of step S110 is YES. However, in step S130 after passage of a predetermined period (for example, the duration of Y pulses of the reference clock signal CLK illustrated in FIG. 6), the determination result is NO because the output APCCP does not become HIGH because of the absence of return light.

On the other hand, if the output APCCP of the comparison part 23 becomes HIGH not because of return light as illustrated in the part of a DAC code value "a+5" of FIG. 10, the determination result of step S110 is YES. In step S130 after passage of a predetermined period (for example, the duration of Y pulses of the reference clock signal CLK illustrated in FIG. 6), the output APCCP remains HIGH because the monitor voltage Vm remains the same value as at the time of step S110, so that the determination result of step S130 is YES.

Thus, if both of the determination result of step S110 and the determination result of step S130 after passage of a predetermined period are YES, it may be determined that the output APCCP of the comparison part 23 has become HIGH not because of return light. That is, a DAC code value corresponding to the proper drive current Iop is correctly set.

If return light does not stop occurring because of abnormality in the optical system, the presence of return light may continue to be acknowledged (it may continue to be not the case that both of the determination result of step S110 and the determination result of step S130 after passage of a predetermined period are YES) endlessly in return light detection sequences. In consideration of such a case, it is desirable to preset a limit (upper limit value) to the number of times the return light detection sequence is repeated so that the return light detection sequence is suspended and an error signal is issued if the limit is exceeded.

According to the flowchart illustrated in FIG. 9, the processing of steps S100 through S150 is repeated at predetermined time intervals. Therefore, even if return light is detected as illustrated in the circled part A in FIG. 10, it is possible to detect the output APCCP of the comparison part 23 becoming HIGH in the subsequent state without return light. According to the flowchart illustrated in FIG. 9, whether the output APCCP is HIGH is determined twice in step S100 and step S130. Alternatively, the flowchart may be modified to perform the determination Z times (where Z is a natural number more than or equal to three). In this case, it may be determined that the output APCCP of the comparison part 23 has become HIGH not because of return light if all of the determination results of Z determinations are YES.

As described above, the ON-current control part 25 controls the ON current Ion illustrated in FIG. 5 and also serves as a return light identification (determination) part in the initialization operation. Further, the APCCP determination part 25a, the counter control part 25b, and the counter part 25c may form a typical example of the return light identification part according to this embodiment.

According to the light amount controller 20g of the first embodiment of the present invention, the return light identification part of the semiconductor integrated circuit part 20f determines whether the output APCCP of the comparison part 23 is HIGH, and after passage of a predetermined period, the return light identification part redetermines whether the output APCCP of the comparison part 23 is HIGH. The predetermined period is sufficiently shorter than the period of occurrence of return light. Then, the return light identification part determines the presence or absence of return light based on the determination results, and determines the current value for turning on the laser diode 20a if the return light identification part determines the absence of return light. As a result, the current value for turning on the laser diode 20a may be set to an appropriate value irrespective of the presence or absence of return light in the initialization operation of the APC circuit 20c.

Second Embodiment

A description is given above in the first embodiment, with reference to FIG. 9 and FIG. 10, of the determination period length, the determination interval, and the number of times determination is performed (the number of determination times), which are preferably freely settable (determinable) in accordance with return light characteristics (such as the period of occurrence of return light). By setting the determination period length, the determination interval, and the number of determination times to suitable values in accordance with return light characteristics, it is possible to handle or respond to various types of return light.

As described above, the determination period length means performing sampling X times (extracting X samples) during the period of X pulses of the reference clock signal CLK. If HIGH (level) is detected at every sampling time, the determination result is YES. If LOW (level) is detected at any one of the X sampling times, the determination result is NO. If the output APCCP includes chattering, it is preferable to set X to a relatively large value. The determination interval is set to the duration of Y pulses of the reference clock signal CLK. If the period of occurrence of return light is long, Y may be a relatively large value. The number of determination times is the number of times the output APCCP is (to be) detected. If the number of determination times is Z, the output APCCP is detected Z times. In this case, it is determined that the output APCCP of the comparison part 23 has become HIGH not because of return light if all of the determination results of Z determinations are YES.

Figure 11:
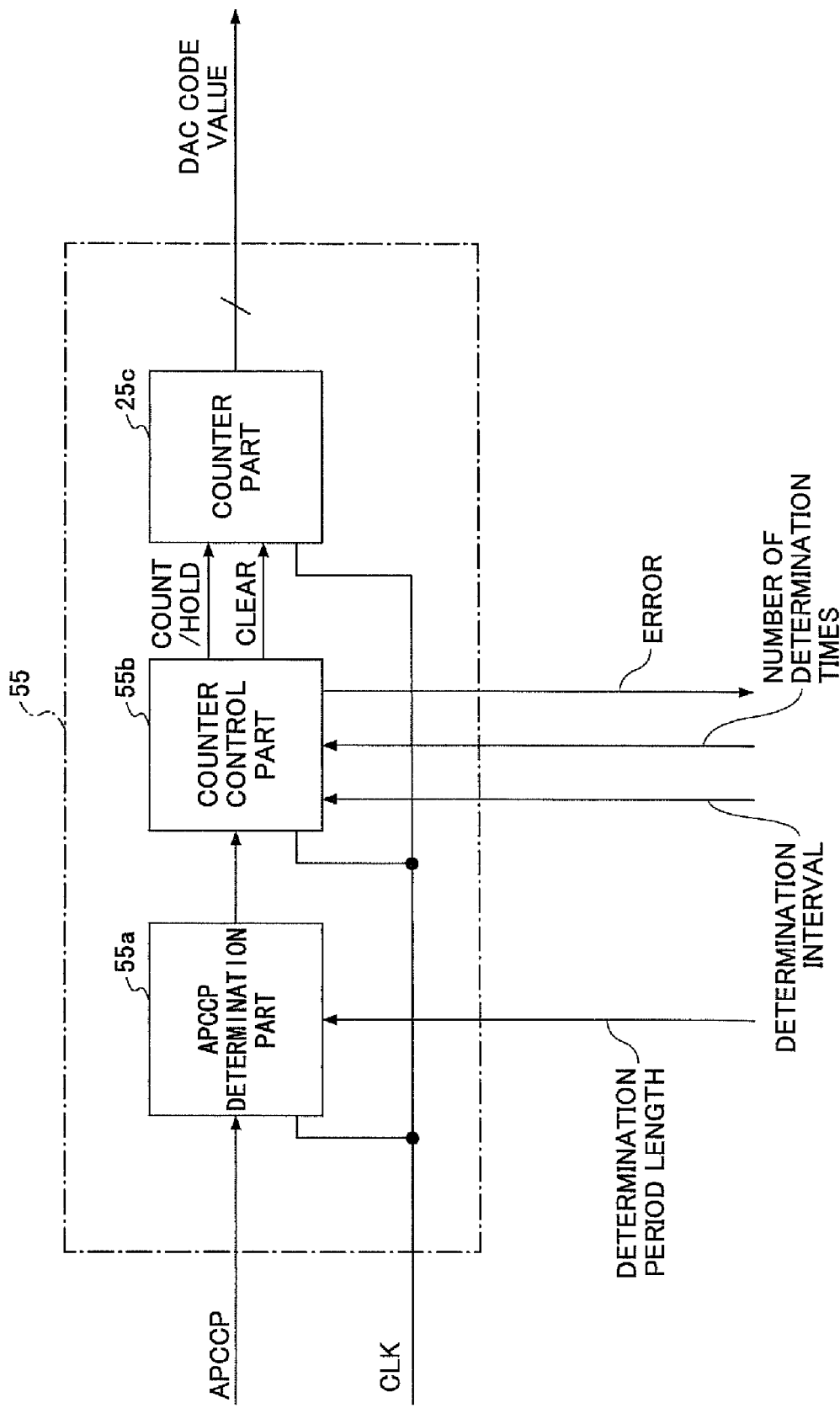
FIG. 11 is a schematic diagram illustrating an ON-current control part of the light amount controller according to a second embodiment of the present invention.

According to a second embodiment of the present invention, the optical scanner 10 has the same configuration as that of the first embodiment except that the ON-current control part 25 of the light amount controller 20g of the first embodiment is replaced with an ON-current control part 55 (FIG. 11). Accordingly, a description of its configuration other than the ON-current control part 55 is omitted.

FIG. 11 is a schematic diagram illustrating the ON-current control part 55 of the light amount controller 20g according to the second embodiment of the present invention. In FIG. 11, the same elements as those of FIG. 6 are referred to by the same reference numerals, and a description thereof may be omitted.

Referring to FIG. 11, the ON-current control part 55 includes an APCCP determination part 55a, a counter control part 55b, and the counter part 25c. The APCCP determination part 55a, the counter control part 55b, and the counter part 25c are connected in series and operate based on the reference clock signal CLK of a predetermined frequency.

The APCCP determination part 55a is configured to determine that the output APCCP has become HIGH. That is, the APCCP determination part 55a serves as a determination part to determine whether the amount of light detected in the PD 20b (FIG. 4), which serves as a light amount detection part, exceeds the reference voltage Vref (FIG. 4), which is a predetermined reference value.

The APCCP determination part 55a is configured to be able to communicate with a host computer (not graphically illustrated) so as to allow X, which is a parameter that determines the determination period length, to be determined (set) from the host computer. When the parameter X is set for the APCCP determination part 55a from the host computer, the APCCP determination part 55a performs sampling X times within the period of X pulses of the reference clock signal CLK in determining that the output APCCP has become HIGH.

The counter control part 55b controls the counting, holding, and clearing of the counter part 25c. The counter control part 55b is configured to be able to communicate with the host computer (not graphically illustrated) so as to allow Y, which is a parameter that determines the determination interval, and the number of determination times Z to be determined (set) from the host computer. When the parameter Y and the number of determination times Z are set for the counter control part 55b from the host computer, the counter control part 55b recognizes the determination result input from the APCCP determination part 55a at the set determination interval. The recognition of the determination result is performed Z times. Further, the counter control part 55b is configured to be able to transmit an error signal to the host computer in response to occurrence of any error.

The ON-current control part 55 controls the ON current Ion illustrated in FIG. 5 and also serves as a return light identification (determination) part in the initialization operation. Further, the APCCP determination part 55a, the counter control part 55b, and the counter part 25c may form a typical example of the return light identification part according to this embodiment.

The initialization operation of the APC circuit 20c (FIG. 4) of the light amount controller 20g according to the second embodiment of the present invention is performed in accordance with the flowchart illustrated in FIG. 9. The initialization operation of the second embodiment is different from that of the first embodiment in that the determination period length, the determination interval, and the number of determination times are determined from the host computer and the operation is performed in accordance with their setup.

According to the second embodiment of the present invention, the light amount controller 20g and accordingly the optical scanner 10 produce the same effects as in the first embodiment. Further, according to the second embodiment, the determination period length, the determination interval, and the number of determination times may be set for the return light identification part of the semiconductor integrated circuit part 20f (FIG. 4) of the light amount controller 20g as desired from the host computer, and the return light identification part may be configured to transmit an error signal to the host computer. As a result, the determination period length, the determination interval, and the number of determination times may be set to optimal values according to return light characteristics also in the case of, for example, mounting the same return light identification part in image forming apparatuses having different return light characteristics from each other.

Third Embodiment

Figure 12:
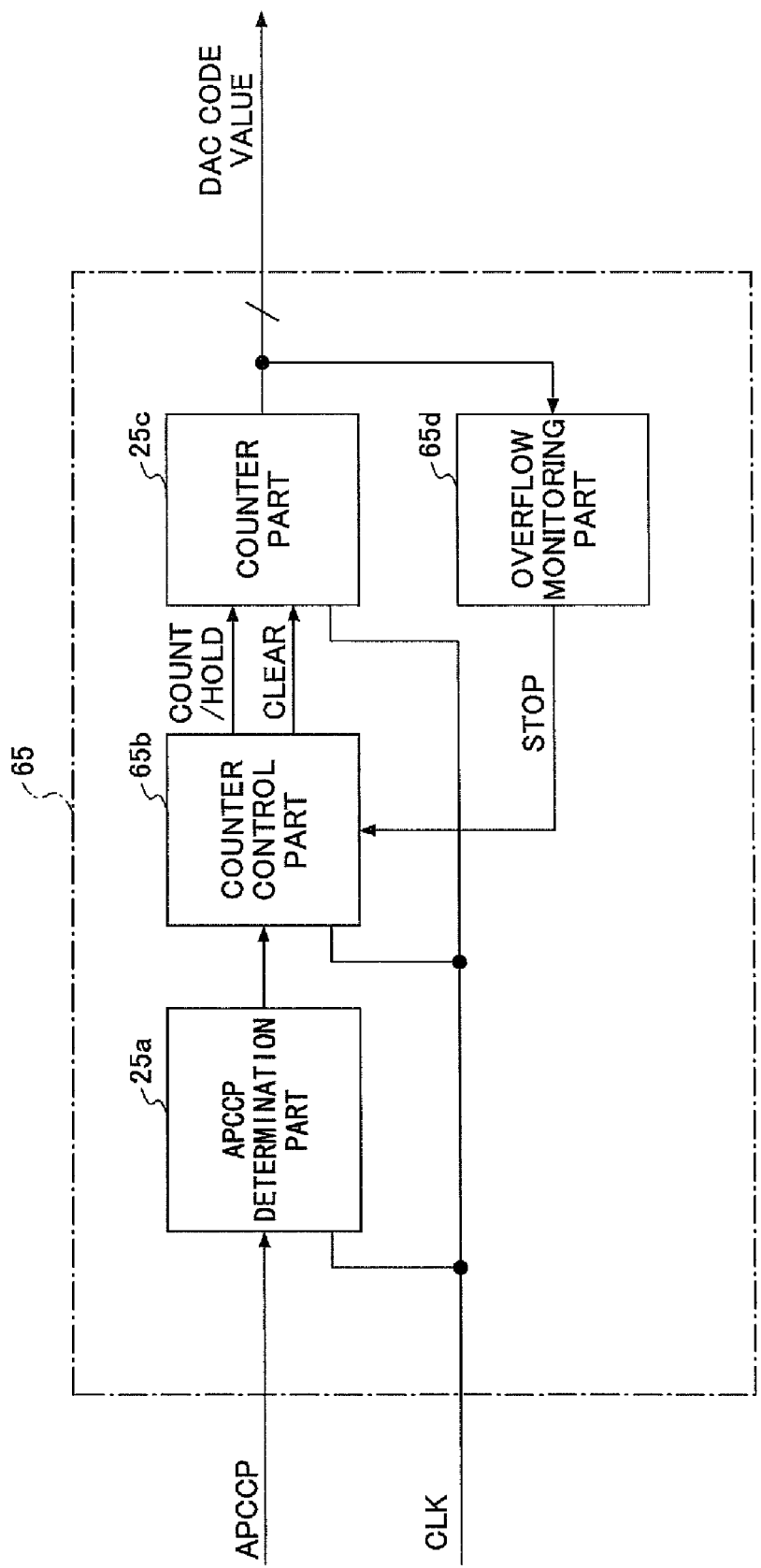
FIG. 12 is a schematic diagram illustrating an ON-current control part of the light amount controller according to a third embodiment of the present invention.

According to a third embodiment of the present invention, the optical scanner 10 has the same configuration as that of the first embodiment except that the ON-current control part 25 of the light amount controller 20g of the first embodiment is replaced with an ON-current control part 65 (FIG. 12). Accordingly, a description of its configuration other than the ON-current control part 65 is omitted.

FIG. 12 is a schematic diagram illustrating the ON-current control part 65 of the light amount controller 20g according to the third embodiment of the present invention. In FIG. 12, the same elements as those of FIG. 6 are referred to by the same reference numerals, and a description thereof may be omitted.

Referring to FIG. 12, the ON-current control part 65 has the same configuration as the ON-current control part 25 illustrated in FIG. 6 except that the counter control part 25b of the ON-current control part 25 is replaced with a counter control part 65b and that an overflow monitoring part 65d is newly added. A description is given below of differences from FIG. 6.

Referring to FIG. 12, the overflow monitoring part 65d is configured so that the DAC code value may be input to the overflow monitoring part 65d from the counter part 25c. Further, a limit to the DAC code value is preset in the overflow monitoring part 65d so that the overflow monitoring part 65d may output a stop signal to the counter control part 65d if the DAC code value input from the counter part 25c exceeds the preset DAC code value limit.

The counter control part 65b controls the counting, holding, and clearing of the counter part 25c. Further, the counter control part 65b stops operations such as a count-up operation and clears the DAC code value to zero (00) in response to the inputting of the stop signal from the overflow monitoring part 65d. As a result, the initialization operation of the APC circuit 20c (FIG. 4) stops. Thus, the overflow monitoring part 65d serves as a monitoring part to monitor the DAC code value so as to prevent the amount of the laser light emitted from the LD 20a (FIG. 4), which serves as a light source, from exceeding a predetermined upper limit (the DAC code value limit).

The ON-current control part 65 controls the ON current Ion illustrated in FIG. 5 and also serves as a return light identification (determination) part in the initialization operation. Further, the APCCP determination part 25a, the counter control part 65b, the counter part 25c, and the overflow monitoring part 65d may form a typical example of the return light identification part according to this embodiment.

The initialization operation of the APC circuit 20c of the light amount controller 20g according to the third embodiment of the present invention is performed in accordance with the flowchart illustrated in FIG. 9. The initialization operation of the third embodiment is different from that of the first embodiment in that a limit is preset to the DAC code value and the initialization operation is suspended in response to the DAC code value exceeding the preset limit.

For example, in step S100 of the flowchart illustrated in FIG. 9, the counter part 25c counts up (increments) its DAC code value in response to instructions from the counter control part 65b, so as to increase the drive current Iop after D/A conversion. At this point, if the output APCCP of the comparison part 23 (FIG. 4) does not become HIGH because of the malfunction of the PD 20b (FIG. 4) or the comparison part 23 in spite of an increase in the amount of the light emitted by the LD 20a, the amount of the light emitted by the LD 20a continues to increase, so that the LD 20a may be broken in the worst case.

The overflow monitoring part 65d, in which a limit to the DAC code value is preset, determines whether the DAC code value input from the counter part 25c has exceeded the preset DAC code value limit. If the overflow monitoring part 65d determines that the DAC code value has exceeded its preset limit, the overflow monitoring part 65d outputs a stop signal to the counter control part 65d to suspend the initialization operation, thereby preventing the breakage of the LD 20a.

According to the third embodiment of the present invention, the light amount controller 20g and accordingly the optical scanner 10 produce the same effects as in the first embodiment. Further, according to the third embodiment, the overflow monitoring part 65d is provided in the ON-current control part 65 that serves as the return light identification part of the semiconductor integrated circuit part 25f (FIG. 4) of the light amount controller 20g, and a limit to the DAC code value is preset in the overflow monitoring part 65d. If the DAC code value input to the overflow monitoring part 65d from the counter part 25c exceeds the preset DAC code value limit, the initialization operation of the APC circuit 20c is suspended. Thereby, it is possible to prevent the breakage of the laser diode 20a.

Fourth Embodiment

Figure 13:
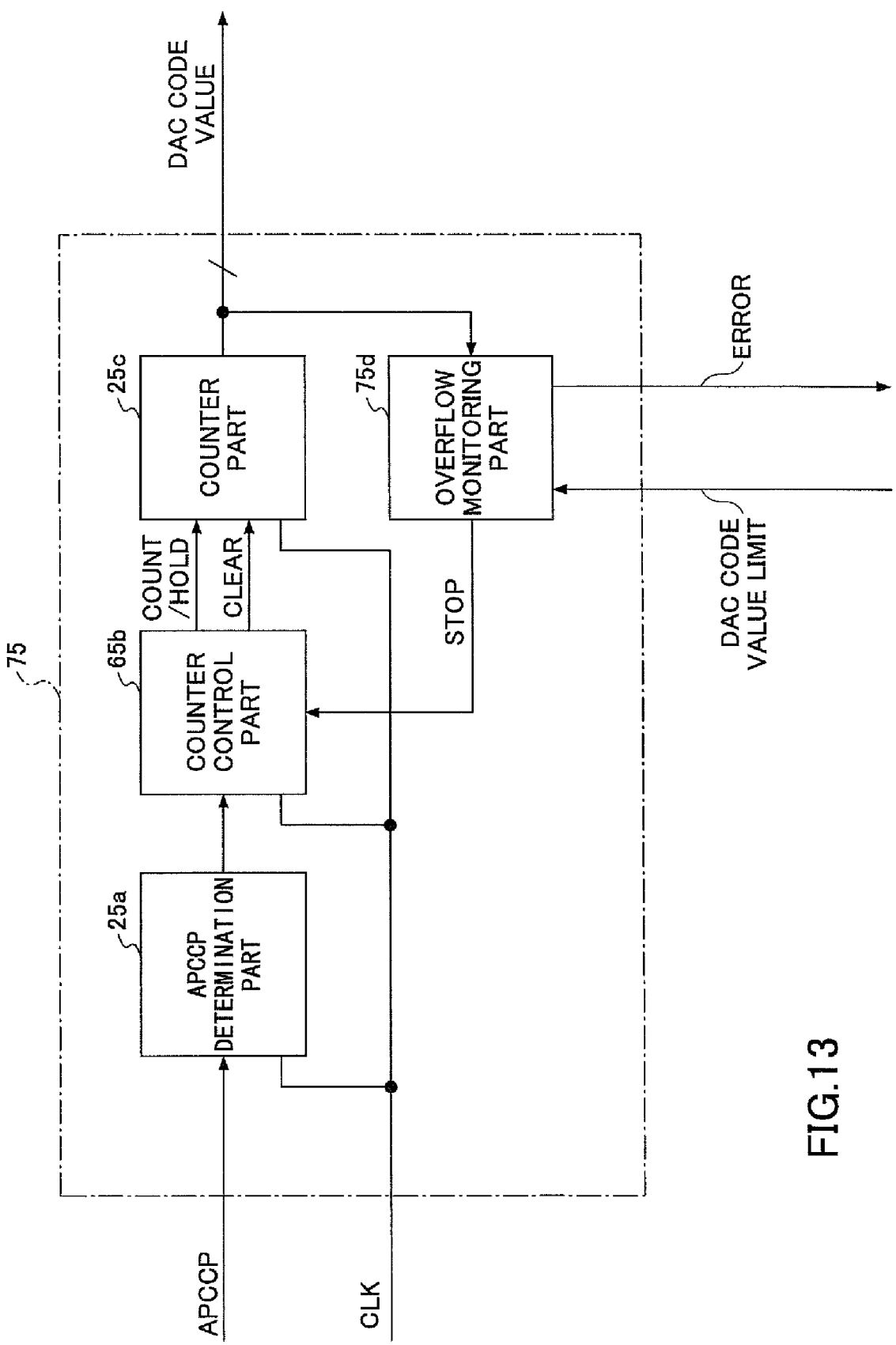
FIG. 13 is a schematic diagram illustrating an ON-current control part of the light amount controller according to a fourth embodiment of the present invention.

According to a fourth embodiment of the present invention, the optical scanner 10 has the same configuration as that of the first embodiment except that the ON-current control part 25 of the light amount controller 20g of the first embodiment is replaced with an ON-current control part 75 (FIG. 13). Accordingly, a description of its configuration other than the ON-current control part 75 is omitted.

FIG. 13 is a schematic diagram illustrating the ON-current control part 75 of the light amount controller 20g according to the fourth embodiment of the present invention. In FIG. 13, the same elements as those of FIG. 12 are referred to by the same reference numerals, and a description thereof may be omitted.

Referring to FIG. 13, the ON-current control part 75 has the same configuration as the ON-current control part 65 illustrated in FIG. 12 except that the overflow monitoring part 65d of the ON-current control part 65 is replaced with an overflow monitoring part 75d. A description is given below of differences from FIG. 12.

Referring to FIG. 13, the overflow monitoring part 75d is configured so that the DAC code value may be input to the overflow monitoring part 75d from the counter part 25c. Further, the overflow monitoring part 75d is configured to be able to communicate with a host computer (not graphically illustrated) so as to allow a limit to the DAC code value to be determined (set) from the host computer. The overflow monitoring part 75d is configured to be able to output a stop signal to the counter control part 65d in response to the DAC code value input from the counter part 25c exceeding the DAC code value limit determined (set) from the host computer. Further, the overflow monitoring part 75d is configured to be able to transmit an error signal to the host computer in response to occurrence of any error.

The counter control part 65b stops operations such as a count-up operation and clears the DAC code value to zero (00) in response to the inputting of the stop signal from the overflow monitoring part 75d. As a result, the initialization operation of the APC circuit 20c (FIG. 4) stops. Thus, the overflow monitoring part 75d serves as a monitoring part to monitor the DAC code value so as to prevent the amount of the laser light emitted from the LD 20*a* (FIG. 4), which serves as a light source, from exceeding a predetermined upper limit (the DAC code value limit).

The ON-current control part 75 controls the ON current Ion illustrated in FIG. 5 and also serves as a return light identification (determination) part in the initialization operation. Further, the APCCP determination part 25*a*, the counter control part 65*b*, the counter part 25*c*, and the overflow monitoring part 75*d* may form a typical example of the return light identification part according to this embodiment.

The initialization operation of the APC circuit 20*c* of the light amount controller 20*g* according to the fourth embodiment of the present invention is performed in accordance with the flowchart illustrated in FIG. 9. The initialization operation of the fourth embodiment is different from that of the first embodiment in that a limit is preset to the DAC code value from the host computer and the initialization operation is suspended in response to the DAC code value exceeding the preset limit.

According to the fourth embodiment of the present invention, the light amount controller 20*g* and accordingly the optical scanner 10 produce the same effects as in the first embodiment and the third embodiment. Further, according to the fourth embodiment, the overflow monitoring part 75*d* is provided in the ON-current control part 75 that serves as the return light identification part of the semiconductor integrated circuit part 25*f* (FIG. 4) of the light amount controller 20*g*. Further, a limit to the DAC code value may be set in the overflow monitoring part 75*d* as desired from the host computer, and the overflow monitoring part 75*d* of the return light identification part may be configured to transmit an error signal to the host computer. This allows the DAC code value limit to be set to an optimal value according to a use environment also in the case of, for example, mounting the same return light identification part in image forming apparatuses having different return light characteristics from each other.

Fifth Embodiment

Figure 14:
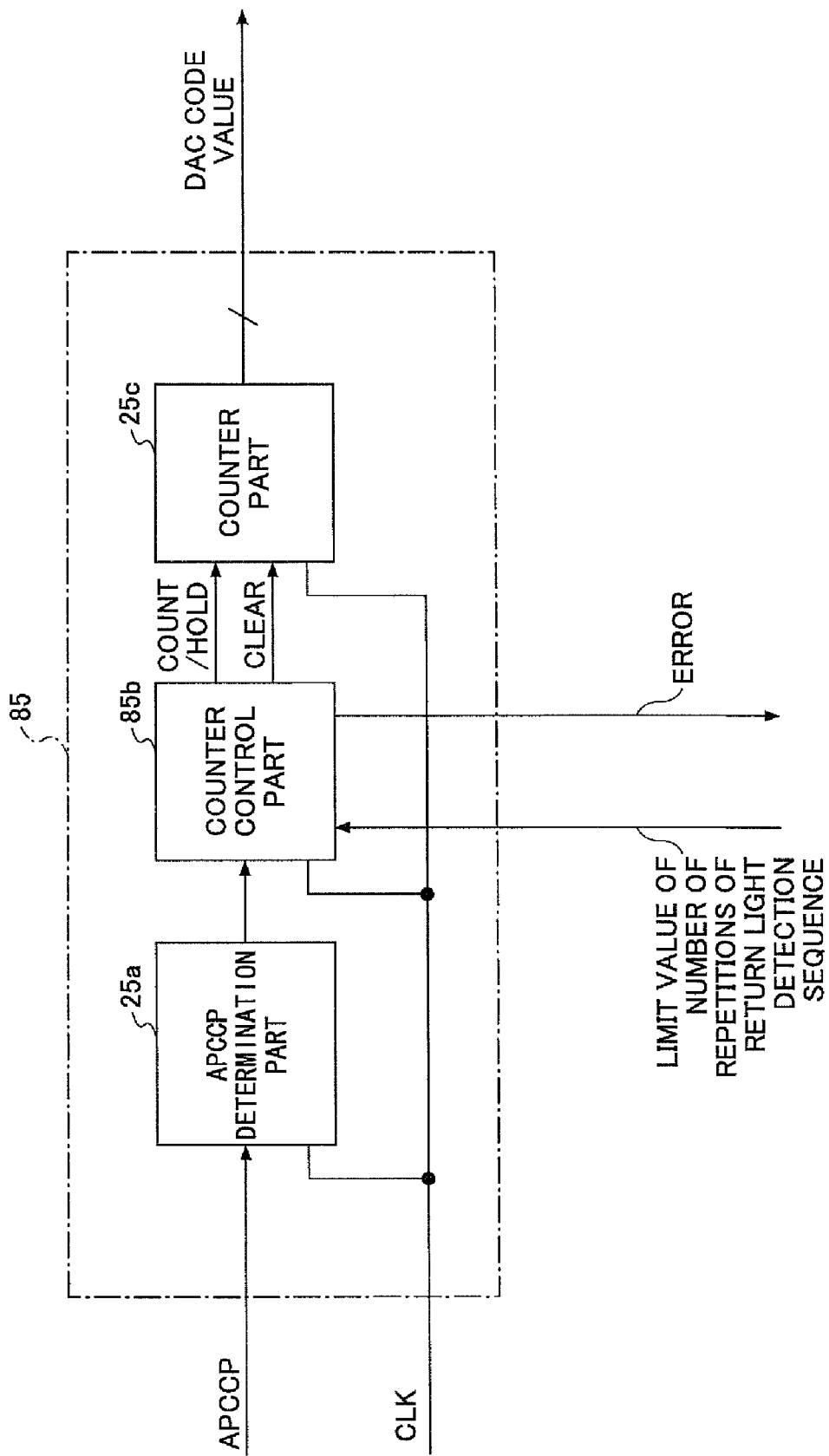
FIG. 14 is a schematic diagram illustrating an ON-current control part of the light amount controller according to a fifth embodiment of the present invention.

According to a fifth embodiment of the present invention, the optical scanner 10 has the same configuration as that of the first embodiment except that the ON-current control part 25 of the light amount controller 20*g* of the first embodiment is replaced with an ON-current control part 85 (FIG. 14). Accordingly, a description of its configuration other than the ON-current control part 85 is omitted.

FIG. 14 is a schematic diagram illustrating the ON-current control part 85 of the light amount controller 20*g* according to the fifth embodiment of the present invention. In FIG. 14, the same elements as those of FIG. 6 are referred to by the same reference numerals, and a description thereof may be omitted.

Referring to FIG. 14, the ON-current control part 85 has the same configuration as the ON-current control part 25 illustrated in FIG. 6 except that the counter control part 25*b* of the ON-current control part 25 is replaced with a counter control part 85*b*. A description is given below of differences from FIG. 6.

The counter control part 85*b* controls the counting, holding, and clearing of the counter part 25*c*. The counter control part 85*b* is configured to be able to communicate with a host computer (not graphically illustrated) so as to allow a limit to the number of times the return light detection sequence is (to be) repeated to be determined (set) from the host computer. The counter control part 85*b* is configured to be able to transmit an error signal to the host computer in response to occurrence of any error. If the number of times the return light detection sequence is (to be) repeated exceeds its limit during the initialization operation, the counter control part 85*b* suspends the return light detection sequence, and transmits an error signal to the host computer.

The ON-current control part 85 controls the ON current Ion illustrated in FIG. 5 and also serves as a return light identification (determination) part in the initialization operation. Further, the APCCP determination part 25*a*, the counter control part 85*b*, and the counter part 25*c* may form a typical example of the return light identification part according to this embodiment.

The initialization operation of the APC circuit 20*c* (FIG. 4) of the light amount controller 20*g* according to the fifth embodiment of the present invention is performed in accordance with the flowchart illustrated in FIG. 9. The initialization operation of the fifth embodiment is different from that of the first embodiment in that a limit is set to the number of times the return light detection sequence is (to be) repeated from the host computer and the return light detection sequence is suspended in response to the number of times the return light detection sequence is (to be) repeated exceeding the set limit.

According to the fifth embodiment of the present invention, the light amount controller 20*g* and accordingly the optical scanner 10 produce the same effects as in the first embodiment. Further, according to the fifth embodiment, a limit to the number of times the return light detection sequence is (to be) performed may be set for the return light identification part of the semiconductor integrated circuit part 25*f* (FIG. 4) of the light amount controller 20*g* as desired from the host computer. Further, the return light identification part may be configured to transmit an error signal to the host computer. This allows the limit value of the number of times the return light detection sequence is (to be) performed to be set to an optimal value according to a use environment also in the case of, for example, mounting the same return light identification part in image forming apparatuses having different return light characteristics from each other.

Sixth Embodiment

Figure 15:
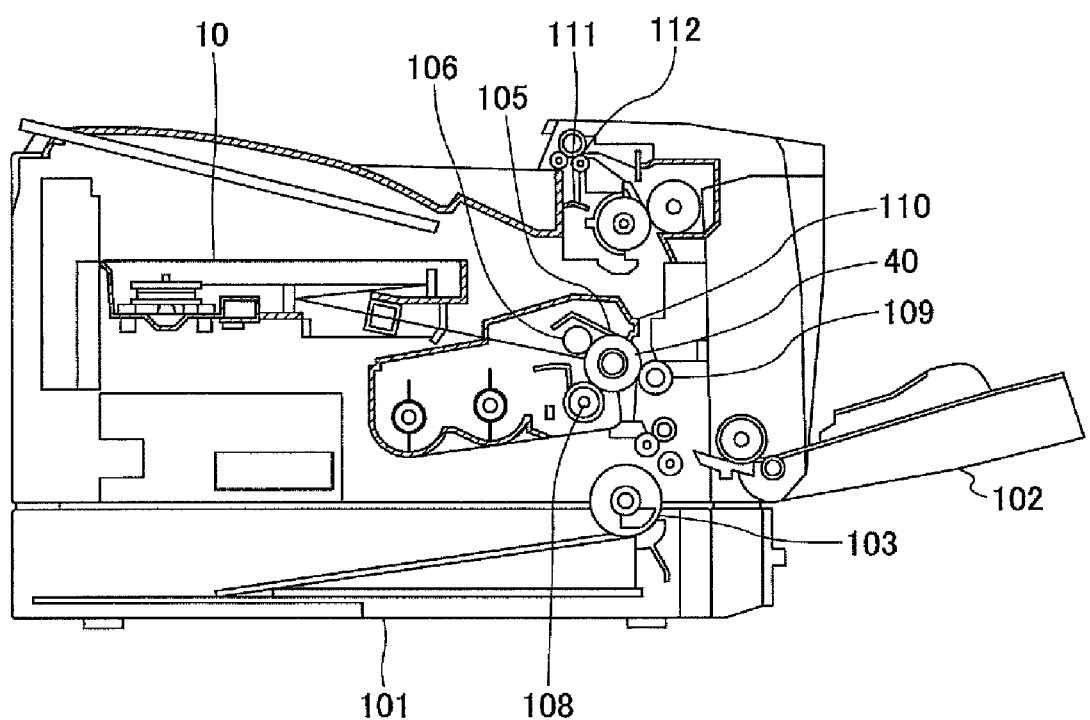
FIG. 15 is a schematic cross-sectional view of an image forming apparatus according to a sixth embodiment of the present invention.

FIG. 15 is a schematic cross-sectional view of an image forming apparatus according to a sixth embodiment of the present invention.

Referring to FIG. 15, by way of example, an image forming apparatus 100 of this embodiment includes the optical scanner 10 of the first embodiment, and forms an image by forming an electrostatic image on a photosensitive body 40 using the optical scanner 10. In the image forming apparatus 100, a recording medium on which an image is to be formed, such as paper, is set in a main body tray 101 or a manual feed tray 102. The conveyance of the recording medium from the main body tray 101 or the manual feed tray 102 is started at a paper feed roller 103. Prior to the conveyance of the recording medium with the paper feed roller 103, the photosensitive body 40, which is an image carrier, rotates so as to have its surface cleaned with a cleaning blade 105 and then charged evenly by a charge roller 106.

The photosensitive body 40 is exposed to laser light modulated in accordance with an image signal and emitted from the optical scanner 10, so that an electrostatic latent image is formed on the surface of the photosensitive body 40. The electrostatic latent image is developed by having toner attached thereto by the development roller 108. In time with this, the recording medium is fed from the paper feed roller 103. The recording medium fed from the paper feed roller 103 is held and conveyed between the photosensitive body 40 and a transfer roller 109, and at the same time, the toner image is transferred onto the recording medium.

Toner remaining on the photosensitive body 40 without being transferred is scraped off by the cleaning blade 105. A toner density sensor 110 is provided before the cleaning blade 105, so that the density of the toner image formed on the photosensitive body 40 may be measured with the toner density sensor 110. Further, the recording medium having the toner image formed thereon is conveyed along a conveyance path to a fixation unit 111, where the toner image is fixed onto the recording medium in the fixation unit 111. Recording media subjected to printing are finally discharged in order of page numbers through a paper discharge roller 112 with their recording surfaces facing downward. The optical scanner 10 of the first embodiment may be replaced with any of the optical scanners (the configurations of the optical scanner 10) according to the second through fifth embodiments of the present invention.

Thus, image forming apparatus including copiers and printers that form an image by forming an electrostatic latent image on a photosensitive body are suitably formed using any of the optical scanners (the configurations of the optical scanner 10) according to the first through fifth embodiments.

The image forming apparatus 100 according to the sixth embodiment of the present invention includes any of the optical scanners (the configurations of the optical scanner 10) according to the first through fifth embodiments. Accordingly, the current value for turning on the laser diode 20a is set to an appropriate value irrespective of the presence or absence of return light in the initialization operation of the APC circuit 20c. As a result, the amount of the laser light emitted from the laser diode 20a is prevented from being lower than its proper value (it is supposed to be), so that it is possible to prevent occurrence of an abnormal image such as an uneven image in the image forming apparatus 100.

The present invention is not limited to the specifically disclosed embodiments, and variations and modifications may be made without departing from the scope of the present invention.

For example, the laser unit 20, in which the cathode of the LD 20a and the anode of the PD 20b are connected as illustrated in FIG. 4, may be replaced with a laser unit where the anode of an LD and the cathode of a PD are connected.

Further, the return light is not limited to that caused by a polygon mirror, and the present invention is effective with respect to return light of any origination as long as the return light occurs not steadily but discontinuously (discretely).

Further, two or more of the first through fifth embodiments may be combined in a suitable manner. For example, a limit to the number of times the return light detection sequence is repeated may be set in the counter control part 55b illustrated in FIG. 11 from the host computer as illustrated in FIG. 14.

The present application is based on Japanese Priority Patent Application No. 2008-205927, filed on Aug. 8, 2008, the entire contents of which are incorporated herein by reference.

What is claimed is:

1. A semiconductor integrated circuit device controlling a first light amount of light emitted from a light source based on a second light amount of light entering a light amount detection part so that the first light amount becomes a target level, the semiconductor integrated circuit device comprising:
a comparison part configured to compare a voltage corresponding to the second light amount and a reference voltage corresponding to the target level; and
a drive current control part configured to control a drive current supplied to the light source based on a result of the comparison by the comparison part,
wherein the drive current control part includes a return light identification part configured to determine whether the second light amount includes a third light amount of return light occurring discontinuously.

2. The semiconductor integrated circuit device as claimed in claim 1, wherein:
the return light identification part includes a determination part configured to determine whether the voltage corresponding to the second light amount exceeds the reference voltage, the determination part being configured to employ multiple determinations performed at a predetermined determination interval as a base cycle and repeat the base cycle, and
the return light identification part is configured to determine whether the second light amount includes the third light amount based on whether results of the multiple determinations are same.

3. The semiconductor integrated circuit device as claimed in claim 2, wherein the predetermined determination interval is shorter than a period of occurrence of the return light.

4. The semiconductor integrated circuit device as claimed in claim 2, wherein the determination part is configured to perform each of the multiple determinations based on whether the voltage corresponding to the second light amount exceeds the reference voltage in every one of multiple comparisons of the voltage corresponding to the second light amount and the reference voltage within a predetermined determination period.

5. The semiconductor integrated circuit device as claimed in claim 4, wherein the predetermined determination period is shorter than a period of occurrence of the return light.

6. The semiconductor integrated circuit device as claimed in claim 4, wherein the return light identification part is configured to have at least one of a number of the multiple determinations by the determination part, the predetermined determination interval, and the predetermined determination period arbitrarily determinable from outside the semiconductor integrated circuit device.

7. The semiconductor integrated circuit device as claimed in claim 2, wherein a predetermined upper limit is set to a number of times the base cycle is repeated by the determination part.

8. The semiconductor integrated circuit device as claimed in claim 7, wherein the return light identification part is configured to have the predetermined upper limit arbitrarily determinable from outside the semiconductor integrated circuit device.

9. The semiconductor integrated circuit device as claimed in claim 1, wherein the return light identification part comprises:
a monitoring part configured to perform monitoring so as to prevent the first light amount from exceeding a predetermined upper limit thereof.

10. The semiconductor integrated circuit device as claimed in claim 9, wherein the return light identification part is configured to have the predetermined upper limit arbitrarily determinable from outside the semiconductor integrated circuit device.

11. An optical scanner, comprising:
a light source;
a light amount detection part configured to detect an amount of entering light;
the semiconductor integrated circuit device as set forth in claim 1; and a deflection part configured to deflect light emitted from the light source on a deflection surface thereof.

12. The optical scanner as claimed in claim 11, wherein the return light is the emitted light reflected from the deflection surface of the deflection part and entering the light amount detection part.

13. An image forming apparatus, comprising:
an optical scanner,
the optical scanner including
  a light source;
  a light amount detection part configured to detect an amount of entering light;
  the semiconductor integrated circuit device as set forth in claim 1; and
  a deflection part configured to deflect light emitted from the light source on a deflection surface thereof,
wherein an image is formed by forming an electrostatic latent image on a photosensitive body by deflecting the emitted light, controlled to be a predetermined light amount by the semiconductor integrated circuit device, with the deflection part and causing the deflected emitted light to scan a photosensitive body.

14. A return light identification method, comprising the steps of:
  (a) emitting a predetermined amount of light from a light source;
  (b) determining whether an amount of light detected in a light amount detection part exceeds a predetermined reference value;
  (c) waiting for a predetermined period while the light source is emitting the predetermined amount of light;
  (d) determining whether the amount of light detected in the light amount detection part exceeds the predetermined reference value; and
  (e) determining occurrence of return light in response to the amount of light exceeding the predetermined reference value in said step (b) and not exceeding the predetermined reference value in said step (d), or determining no occurrence of the return light in response to the amount of light exceeding the predetermined reference value in said step (b) and said step (d).

15. The return light identification method as claimed in claim 14, wherein:
  said steps (b) through (e) are determined as a base cycle, and
  the base cycle is repeated a predetermined number of times.

16. The return light identification method as claimed in claim 14, further comprising the step of:
  (f) repeating, a predetermined number of times between said steps (d) and (e), the steps of (g) waiting for the predetermined period while the light source is emitting the predetermined amount of light and (h) determining whether the amount of light detected in the light amount detection part exceeds the predetermined reference value.

* * * * *